US011693406B2

(12) United States Patent
McGee et al.

(10) Patent No.: US 11,693,406 B2
(45) Date of Patent: Jul. 4, 2023

(54) TASK COMPLETION TIME ESTIMATION FOR AN AUTONOMOUS MACHINE

(71) Applicant: Caterpillar Paving Products Inc., Brooklyn Park, MN (US)

(72) Inventors: Robert Jason McGee, Peoria, IL (US); Sangameshwar Sonth, Dunlap, IL (US); Timothy O'Donnell, Long Lake, MN (US); Kristen Ann Gerstner, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 674 days.

(21) Appl. No.: 16/810,547

(22) Filed: Mar. 5, 2020

(65) Prior Publication Data

US 2021/0278841 A1 Sep. 9, 2021

(51) Int. Cl.
| | | |
|---|---|---|
| *G05D 1/00* | (2006.01) | |
| *G07C 5/06* | (2006.01) | |
| *G06N 5/04* | (2023.01) | |
| *B60W 10/04* | (2006.01) | |
| *B60W 10/20* | (2006.01) | |
| *B60W 50/14* | (2020.01) | |
| *E01C 19/26* | (2006.01) | |
| *B60W 30/18* | (2012.01) | |

(52) U.S. Cl.
CPC ............ *G05D 1/0088* (2013.01); *B60W 10/04* (2013.01); *B60W 10/20* (2013.01); *B60W 30/18009* (2013.01); *B60W 50/14* (2013.01); *E01C 19/26* (2013.01); *G06N 5/04* (2013.01); *G07C 5/06* (2013.01); *B60W 2050/143* (2013.01); *B60W 2050/146* (2013.01); *B60W 2300/17* (2013.01); *B60W 2710/20* (2013.01); *B60W 2720/10* (2013.01)

(58) Field of Classification Search
CPC .... G05D 1/0088; B60W 10/04; B60W 10/20; B60W 30/18009; B60W 50/14; E01C 19/26; G06N 5/04; G07C 5/06
See application file for complete search history.

(56) References Cited

U.S. PATENT DOCUMENTS

| | | | |
|---|---|---|---|
| 9,164,513 B2 | 10/2015 | Matsuzaki | |
| 9,205,777 B2 | 12/2015 | Swenson | |
| 10,214,877 B2 | 2/2019 | Yamada | |
| 10,293,838 B1 | 5/2019 | Szybalski | |
| 2019/0389382 A1 | 12/2019 | Nishii | |
| 2021/0197685 A1* | 7/2021 | Soon ........................ | H02J 7/02 |

FOREIGN PATENT DOCUMENTS

| | | | |
|---|---|---|---|
| CN | 110325934 A | 10/2019 | |
| JP | 6253677 B2 | 12/2017 | |
| JP | 6481221 B2 | 3/2019 | |

* cited by examiner

*Primary Examiner* — Michael D Lang
(74) *Attorney, Agent, or Firm* — Harrity & Harrity, LLP (57) ABSTRACT

A machine is disclosed. The machine may include at least one of a propulsion system or a steering system configured to operate under automatic control in an autonomous mode of the machine; and a controller configured to obtain one or more parameters associated with a task that is to be performed in the autonomous mode, determine an estimated completion time for the task based on the one or more parameters associated with the task, and perform one or more actions based on the estimated completion time for the task.

20 Claims, 3 Drawing Sheets

TASK COMPLETION TIME ESTIMATION FOR AN AUTONOMOUS MACHINE

TECHNICAL FIELD

The present disclosure relates generally to an autonomous machine and, for example, to task completion time estimation for the autonomous machine.

BACKGROUND

Compaction of a surface material, such as soil or asphalt, can improve strength and stability of the surface to a particular degree required for a construction operation. Typically, compaction is performed by a mobile compactor machine. One type of compactor machine is an autonomous compactor machine, which performs compaction tasks over a defined area using a set of defined compaction settings without control by a human operator. This can enhance the productivity of the machine, and reduce the human resources required for controlling operation of a worksite. However, it may be difficult for a supervisor of the worksite to determine a completion time of tasks that are to be performed autonomously by the machine. As a result, machine resource utilization, worksite scheduling, and/or the like, may not be optimized.

The completion time estimation system of the present disclosure solves one or more of the problems set forth above and/or other problems in the art.

SUMMARY

According to some implementations, a machine may include at least one of a propulsion system or a steering system configured to operate under automatic control in an autonomous mode of the machine; and a controller configured to obtain one or more parameters associated with a task that is to be performed in the autonomous mode, determine an estimated completion time for the task based on the one or more parameters associated with the task, and perform one or more actions based on the estimated completion time for the task.

According to some implementations, a completion time estimation system may include a controller configured to obtain one or more parameters associated with a task that is to be performed in an autonomous mode of a machine, the task being one of a plurality of tasks that are to be performed in the autonomous mode of the machine; determine an estimated completion time for the task based on the one or more parameters associated with the task; cause storage of information identifying an association between the task and the estimated completion time; and selectively cause an initiation of the task in the autonomous mode of the machine, according to the association between the task and the estimated completion time, based on whether a selection is of the task or another task of the plurality of tasks.

According to some implementations, a method may include obtaining one or more parameters associated with a task that is to be performed in an autonomous mode of a machine; determining an estimated completion time for the task based on the one or more parameters associated with the task; determining, while the machine is performing the task in the autonomous mode, an updated estimated completion time based on an elapsed time since initiation of the task, and a progress of the task based on a movement of the machine; causing storage of information identifying an association between the updated estimated completion time and the progress of the task; and performing one or more actions based on the association between the updated estimated completion time and the progress of the task.

DETAILED DESCRIPTION

This disclosure relates to a completion time estimation system. The completion time estimation system has universal applicability to any machine that can operate in an autonomous mode, such a compactor machine, a paving machine, a cold planer, a grading machine, or the like.

Figure 1:
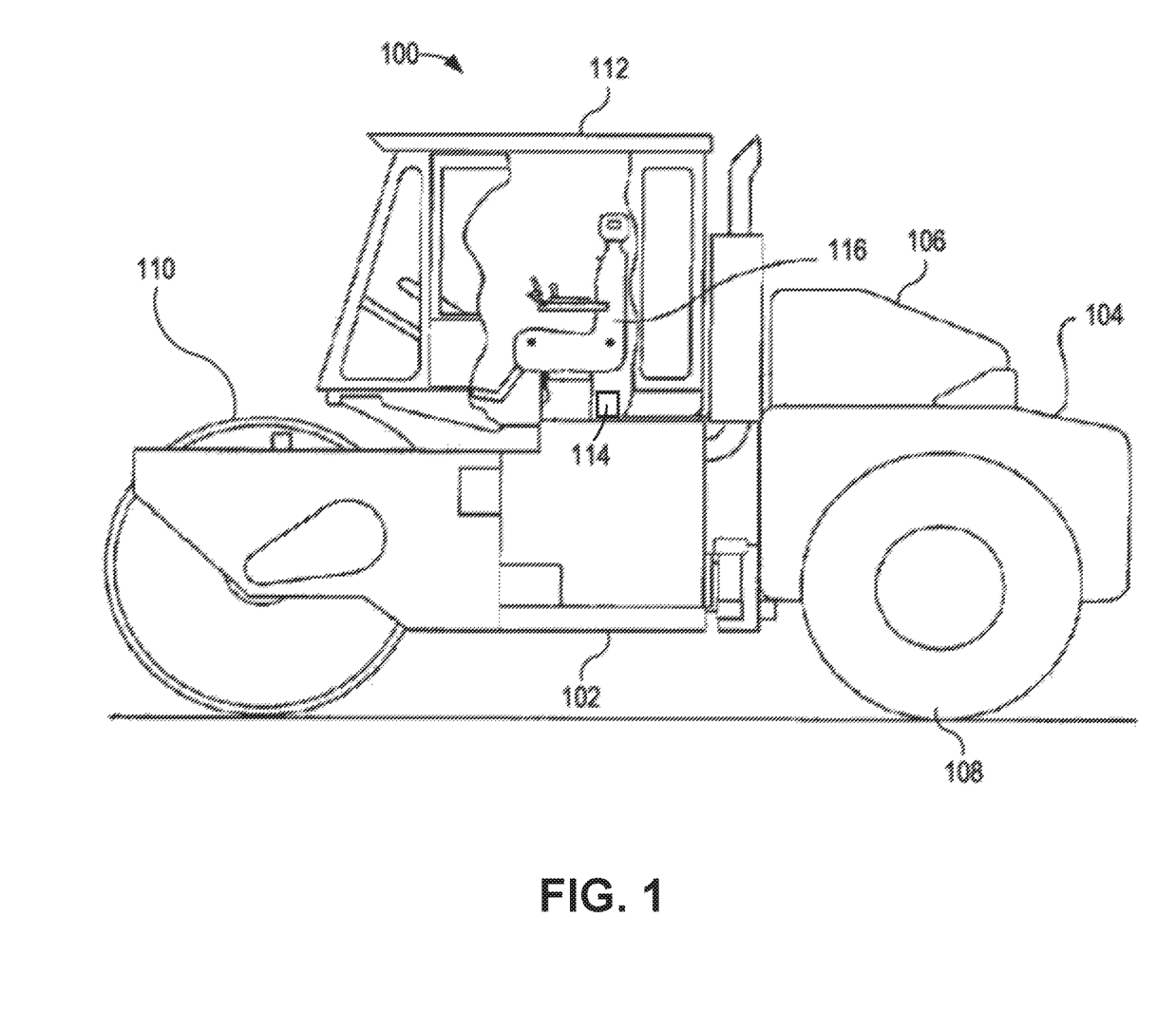
FIG. 1 is diagram of an example machine described herein.

FIG. 1 is a diagram of an example machine 100 described herein. As shown in FIG. 1, the machine 100 may be a compactor machine (e.g., a vibratory drum compactor machine), which may be used to compact various materials, such as soil, asphalt, and/or the like. As shown in FIG. 1, the machine 100 includes a frame 102 that is attached to, and supports, a body 104. The frame 102 may include multiple portions and/or separate frames coupled to one another. For example, the frame 102 may include multiple coupled frames configured to articulate relative to one another.

The machine 100 also includes a power generator 106, which is configured to generate power to propel the machine 100. The power generator 106 includes one or more power generation devices, such as an internal combustion engine (e.g., a gasoline and/or a diesel internal combustion engine), an electric motor, and/or the like.

The power generator 106 is operatively coupled to wheels 108. Although not depicted, the machine 100 includes brakes associated with the wheels 108. In some implementations, the machine 100 may employ other ground engaging members in addition to, or instead of, the wheels 108. For example, the machine 100 may include tracks. The power generator 106 also may be operatively coupled to one or more drive train components, such as a transmission configured to transmit the power generated by the power generator 106 to the wheels 108. In addition, the power generator 106 may provide power for various operational elements of the machine 100, such as one or more implements attached to the machine 100.

The machine 100 includes a drum 110. The drum 110 is coupled to the frame 102 and is configured to rotate relative to the frame 102 about an axis perpendicular to a travel direction of the machine 100. The drum 110 provides compaction force to process materials, such as asphalt, soil, and/or the like. For example, the drum 110 provides static compaction forces due to a weight of the drum 110. In addition, the drum 110 includes one or more mechanisms configured to vibrate the drum and thereby provide dynamic compaction forces. The one or more mechanisms may be surrounded by the drum 110 (e.g., internal to the drum 110), and may include a weight that is rotated (e.g., about the axis perpendicular to the travel direction) to provide vibration of the drum 110. In some configurations, the machine 100 may include a second drum, as described above, in place of the wheels 108.

In some implementations, the machine 100 is a grading machine (not shown). In this example, the machine 100 does not include the drum 110, and may include a blade, a drawbar-circle-moldboard assembly, and/or the like. Alternatively, the machine 100 may include a blade, a drawbar-circle-moldboard assembly, and/or the like, in addition to the drum 110.

The machine 100 includes an operator station 112. A human operator of the machine 100 may occupy the operator station 112 to manually control various functions and motions of the machine 100 by, for example, a steering mechanism, one or more control inputs (e.g., a speed throttle, an implement control lever, and/or the like), a console, and/or other user inputs.

In addition, the machine 100 is configured to operate in an autonomous mode (e.g., using a global positioning system (GPS), a light detection and ranging (LIDAR) system, and/or the like). A machine configured to operate in an autonomous mode may be referred to as an autonomous machine (although particular operations of the machine may be manually controlled). In the autonomous mode, one or more functions of the machine 100 may be automatically controlled by a controller 114 (e.g., an electronic control module (ECM)) of the machine 100, rather than manually controlled by a human operator. As shown in FIG. 1, the controller 114 is located behind a seat 116 of the machine 100, however, the controller 114 may be located at other locations of the machine 100.

In the autonomous mode, the controller 114 may provide automatic control of a propulsion operation, a steering operation, and/or a work operation of the machine 100 (e.g., in connection with one or more sensors of the machine 100). In this case, a human operator may occupy the operator station 112 to observe operation of the machine 100 and/or to override the autonomous mode and provide manual control of the machine 100 as needed. In some cases, a human operator may not occupy the operator station 112, and may remotely observe operation of the machine 100 and/or remotely override the autonomous mode to provide manual control, such as via a remote control device.

The controller 114 may include one or more memories and/or one or more processors that implement operations associated with the autonomous mode of the machine 100 and/or task completion time estimation, as described in connection with FIG. 2. For example, the controller 114 may be configured to obtain one or more parameters associated with a task that is to be performed in the autonomous mode, determine an estimated completion time for the task based on the one or more parameters, perform one or more actions based on the estimated completion time, and/or the like.

As indicated above, FIG. 1 is provided as an example. Other examples may differ from what was described in connection with FIG. 1.

Figure 2:
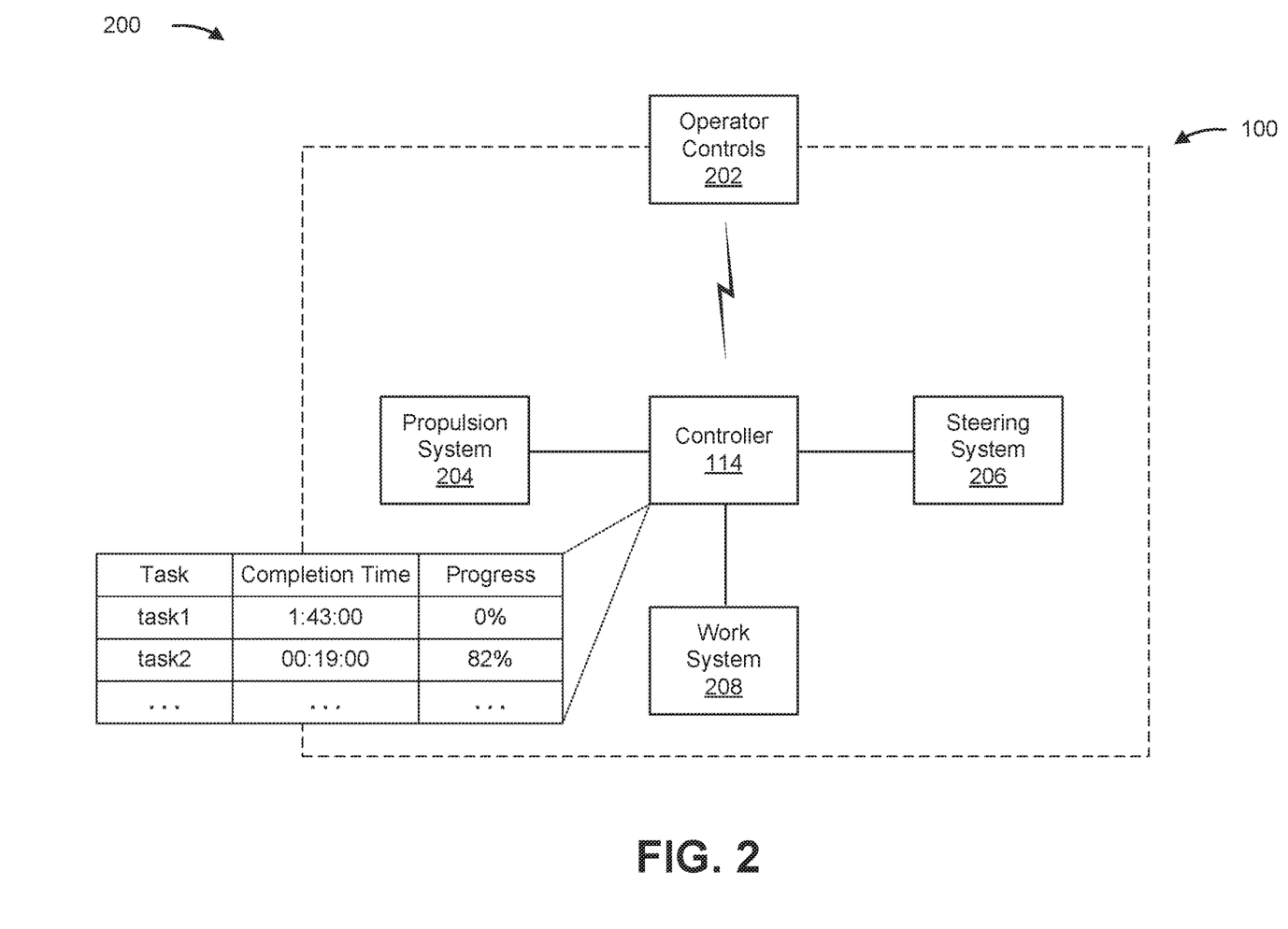
FIG. 2 is diagram of an example completion time estimation system described herein.

FIG. 2 is a diagram of an example completion time estimation system 200 described herein. As shown in FIG. 2, the machine 100 includes the completion time estimation system 200. The completion time estimation system 200 includes the controller 114, operator controls 202, a propulsion system 204, a steering system 206, and a work system 208. The work system 208 may be a compaction system in an example in which the machine 100 is a compactor machine, a grading system in an example in which the machine 100 is a grading machine, and/or the like. The work system 208 may include other systems in examples in which the machine 100 is another machine, such as a paving machine, a cold planer, or the like.

The operator controls 202 include one or more input devices configured to receive an operator command from a human operator of the machine 100, and provide information relating to the command to the controller 114. For example, the operator controls 202 may be one or more control inputs (e.g., one or more buttons, joysticks, levers, and/or the like), one or more consoles, and/or other user inputs, as described in connection with FIG. 1, that are included in the machine 100 and have a wired connection to the controller 114. As another example, the operator controls 202 may be one or more remote control devices, and/or other user inputs, as described in connection with FIG. 1, that are remotely located from the machine 100 and have a wireless connection to the controller 114.

A human operator of the machine 100 (e.g., a human operator that is occupying the operator station 112 or that is remotely located) may use the operator controls 202 to configure parameters for one or more tasks (e.g., compaction tasks, grading tasks, and/or the like) that are to be performed in an autonomous mode of the machine 100. For example, the parameters may include an area (e.g., a geographical area, one or more geographical boundaries, and/or the like) in which the machine 100 is to perform a task (e.g., a compaction task, a grading task, and/or the like), a quantity of times that the machine 100 is to perform the task (e.g., perform compaction of the area, perform grading of the area, and/or the like), settings for the task (e.g., a vibration frequency and/or amplitude that is to be used for a compaction task, a blade height and/or blade angle that is to be used for a grading task, and/or the like), and/or the like. The controller 114 may store, or cause another device to store, the parameters for the one or more tasks.

The controller 114 may obtain the parameters associated with a task (e.g., from storage or from the operator controls 202) in order to determine an estimated completion time for the task. The task may be a compaction task or a grading task, and the parameters relate to one or more of an area (e.g., configured by a human operator) in which the machine 100 is to perform the compaction task or the grading task, an amount of overlap that is configured (e.g., by a human operator) for lanes of the area, a quantity of passes that is configured (e.g., by a human operator) for the area, and/or the like. In addition, the parameters associated with the task may relate to capabilities or specifications of the machine 100. For example, the parameters may relate to one or more of a speed (e.g., a land speed) at which the machine 100 is to perform the compaction task, a drum width (e.g., along the axis perpendicular to the travel direction of the machine 100) of the drum 110 of the machine 100, a blade width of the machine 100, a maneuver distance used by the machine 100 when changing lanes of the area, or a maneuver speed (including a rate of deceleration used to transition from the speed to the maneuver speed and/or a rate of acceleration used to transition from the maneuver speed to the speed) used by the machine 100 when changing lanes of the area, and/or the like.

The controller 114 may determine the estimated completion time for the task (e.g., a compaction task, a grading task, and/or the like) based on the parameters. The estimated completion time identifies an amount time that the task is estimated to take from initiation of the task to completion of the task. The controller 114 may also determine an amount of progress for the task, which may be zero percent, or the like, prior to initiation of the task.

The controller 114 may determine the estimated completion time for the task using one or more algorithms, models, and/or the like. For example, the controller 114 may use the parameters in connection with an algorithm to determine the estimated competition time for the task. As another example, the controller 114 may use a model, such as a machine learning model, to determine the estimated completion time for the task. The machine learning model may be trained using historical data relating to parameters used for one or more tasks and actual completion times for the one or more tasks. The controller 114 may input the parameters to the machine learning model, and obtain an estimated completion time as an output of the machine learning model.

The controller 114 may perform one or more actions based on the estimated competition time and/or the progress of the task that is determined. An action performed by the controller 114 may include causing a display of the machine 100 (e.g., a display located in the operator station 112, a remote display associated with the machine 100, and/or the like) to display the estimated completion time and/or the progress of the task.

An action performed by the controller 114 may include generating, or updating, a schedule for the machine 100. The schedule may indicate times when the machine 100 is to be present at various locations at a worksite, times when the machine 100 is to be performing particular tasks, and/or the like. The schedule may be based on the estimated completion time and/or the progress. For example, if the estimated completion time for the task satisfies (e.g., is greater than) a threshold amount of time, the controller 114 may schedule the task for a particular time of day (e.g., the morning), schedule the task for another day (e.g., another day for which less tasks are scheduled), pair the task on the schedule with another task associated with an estimated completion time that does not satisfy (e.g., is less than) a threshold amount of time, and/or the like.

An action performed by the controller 114 may include causing transmission of information that identifies the estimated completion time and/or the progress to a device (e.g., a server device). The device may use the information to perform scheduling of a worksite in which the machine 100 operates. For example, based on the estimated completion time, the device may determine that the machine 100 is to be scheduled to perform the task before or after another machine is scheduled to perform another task (e.g., another task that may affect, or be affected by, performance of the task).

An action performed by the controller 114 may include generating an alert (e.g., that is displayed on the display of the machine 100). For example, the alert may be generated based on a determination by the controller 114 that an amount of fuel in the machine 100 is insufficient to power the machine 100 until the estimated completion time. As another example, the alert may be generated based on a determination by the controller 114 that an amount of time remaining in a shift, an amount of time before sundown, an amount of time before a change in weather conditions, an amount of time before the machine 100 is scheduled to be at another location, and/or the like, is less than the estimated completion time.

An action performed by the controller 114 may include causing transmission of a notification (e.g., via a communication interface associated with the controller). The notification may indicate the estimated completion time, the progress, a schedule, an alert, and/or the like. The controller 114 may cause the notification to be transmitted to a user device, such as a user device associated with a supervisor of a worksite or a human operator of the machine 100. The controller 114 may cause the notification to be transmitted when the estimated completion time satisfies (e.g., is greater than) a threshold amount of time. The threshold amount of time may be a time when a shift is over, a time associated with sundown, a time associated with a change in weather conditions, a time when the machine 100 is scheduled to be at another location, and/or the like.

In some implementations, the controller 114 stores, or causes another device to store, information identifying an association between the task and the estimated completion time. This association may be used when the machine 100 is switching between multiple tasks. For example, the controller 114 may store, or cause another device to store, information identifying respective associations between multiple tasks and multiple estimated completion times (determined, as described above). Accordingly, when a particular task, of the multiple tasks, is selected (e.g., by a human operator), the controller 114 may determine the estimated completion time for the selected task based on such an association.

A human operator of the machine 100 may use the operator controls 202 to command the initiation of the task in the autonomous mode. In some implementations, the autonomous mode is automatically initiated (e.g., by the controller 114) based on one or more criteria for automatically initiating the autonomous mode. Based on a command (e.g., an operator command) to initiate the autonomous mode (e.g., via the operator controls 202), the controller 114 may cause initiation of the task in the autonomous mode. The task is performed in the autonomous mode according to the parameters for the task, described above.

Based on a command (e.g., an operator command) to initiate performance of the task in the autonomous mode (e.g., via the operator controls 202), the controller 114 may obtain the stored information identifying the association between the estimated completion time and the task, and may cause initiation of the task in the autonomous mode according to the association between the estimated completion time and the task. That is, the controller 114 may cause the task to be initiated with the estimated completion time (e.g., the task is initiated with the estimated completion time displayed, or otherwise notified to a human operator, a supervisor, a device that performs scheduling, and/or the like). The controller 114 may selectively initiate the task in the autonomous mode, when there are multiple configured tasks, based on a selection of a human operator of the machine 100. In other words, when the task is selected for initiation in the autonomous mode by a human operator, the controller 114 may obtain the estimated completion time for the task based on the stored association between the estimated completion time and the task.

The autonomous mode of the machine 100 provides automatic control of the propulsion system 204, the steering system 206, and/or the work system 208 for performance of the task. That is, in the autonomous mode, the controller 114 provides control (e.g., according to the parameters for the task) of the propulsion system 204, the steering system 206, and/or the work system 208, rather than those systems being manually controlled by a human operator.

The propulsion system 204 includes systems and mechanisms of the machine 100 that perform operations relating to the propulsion (e.g., forward or reverse movement of the machine 100) and braking of the machine 100. In other words, the propulsion system 204 provides a propulsion operation of the machine 100. The propulsion system 204 may include the wheels 108, brakes associated with the wheels 108, a transmission, other drive train components, and/or the like. Accordingly, in the autonomous mode, the controller 114 provides automatic control of forward movement, reverse movement, speed, acceleration, braking, and/or the like, of the machine 100.

The steering system 206 includes systems and mechanisms of the machine 100 that perform operations relating to the steering and directional movement of the machine 100. In other words, the steering system 206 provides a steering operation of the machine 100. The steering system 206 may include a steering mechanism, the wheels 108, and/or the like. Accordingly, in the autonomous mode, the controller 114 provides automatic control of turning, drift correction, and/or the like, of the machine 100.

The work system 208 (e.g., a vibratory compaction system, a grading system, and/or the like) includes systems and mechanisms of the machine 100 that perform operations relating to a work operation of the machine 100. In other words, the work system 208 provides a work operation of the machine 100. The work operation may be a compaction operation, a grading operation, and/or the like.

The work system 208 (e.g., a vibratory compaction system) may include the drum 110, a vibratory mechanism of the drum 110, and/or the like. Accordingly, in the autonomous mode, the controller 114 provides automatic control of vibration of the drum 110, and/or the like. For example, the controller 114 may maintain vibration of the drum 110 in accordance with the set of parameters for the task, enable or disable vibration of the drum 110 based on whether the machine 100 is moving or stationary, and/or the like.

The work system 208 (e.g., a grading system) may include a blade, a blade assembly, a drawbar-circle-moldboard assembly, one or more hydraulic cylinders (e.g., for positioning a blade), and/or the like. Accordingly, in the autonomous mode, the controller 114 provides automatic control of a height of the blade, an angle of the blade, whether the blade is disengaged from a surface material, and/or the like. For example, the controller 114 may maintain a height and/or an angle of the blade in accordance with the set of parameters for the autonomous mode.

The work system 208 may include another implement of the machine 100. Accordingly, in the autonomous mode, the controller 114 provides automatic control of a position of the implement, a functionality of the implement, and/or the like.

While the machine 100 is performing the task in the autonomous mode, the controller 114 may determine an updated estimated completion time and/or an updated progress of the task. The updated estimated completion time is based on an elapsed time since initiation of the task (e.g., the updated estimated completion time is the estimated completion time reduced by the elapsed time). The updated progress of the task is based on a movement of the machine 100. For example, the controller 114 may determine a percentage of the task that has been completed, since initiation of the task, based on the movement of the machine 100. The controller 114 may determine the movement of the machine 100 based on location data (e.g., latitude and longitude coordinates) relating to a location of the machine 100 since initiation of the task. Thus, the updated progress of the task may be associated with location data that identifies a location of the machine 100 at a time that the progress of the task is updated.

In addition, while the machine 100 is performing the task in the autonomous mode, a human operator of the machine 100 may use the operator controls 202 to command that performance of the task be discontinued. In some implementations, performance of the task is automatically discontinued (e.g., by the controller 114) based on one or more criteria for automatically discontinuing a task. For example, a criterium may be whether the machine 100 has sufficient fuel to complete the task, whether a shift has ended, whether sundown has occurred, whether a change in weather conditions has occurred, and/or the like.

In some cases, performance of the task may be discontinued so that the machine 100 can perform another task. In this case, the controller 114 may store, or cause another device to store, information identifying an association between the updated completion time and the updated progress (e.g., the updated completion time and the updated progress at the time that performance of the task is discontinued), as described above.

Subsequently, a human operator of the machine 100 may use the operator controls 202 to command that performance of the task be continued. In some implementations, performance of the task is automatically continued (e.g., by the controller 114) based on one or more criteria for automatically continuing a task. For example, a criterium may be whether a schedule for the machine 100 has been updated, whether a schedule for a worksite has been updated, and/or the like.

Based on a command (e.g., an operator command) to continue performance of the task (e.g., via the operator controls 202), the controller 114 may obtain the stored information identifying the association between the updated estimated completion time and the updated progress, and cause the machine 100 to continue performance of the task in the autonomous mode. The controller 114 may cause the task to be continued with the updated estimated completion time (e.g., the task is continued with the updated estimated completion time displayed, or otherwise notified to a human operator, a supervisor, a device that performs scheduling, and/or the like). Moreover, performance of the task is continued using the association between the updated estimated completion time and the updated progress of the task. For example, the controller 114 may determine a location associated with the amount of progress, and determine that the estimated completion time from the location (based on the amount of progress) is the updated estimated completion time.

After the task is completed, the controller 114 may perform one or more actions. An action may include generating, or updating, a schedule based on completion of the task. An action may include transmitting a notification (e.g., to a user device, a server device, and/or the like) that indicates completion of the task. An action may include determining an actual time that was taken to complete the task, which may be used to refine an algorithm or model used to determine an estimated completion time. An action may include generating a report that details the task, the estimated completion time, an actual completion time, discontinuations and/or continuations of the task, and/or the like, which may be used to identify optimal machine utilization, inefficiencies, and/or the like.

As indicated above, FIG. 2 is provided as an example. Other examples may differ from what was described in connection with FIG. 2.

Figure 3:
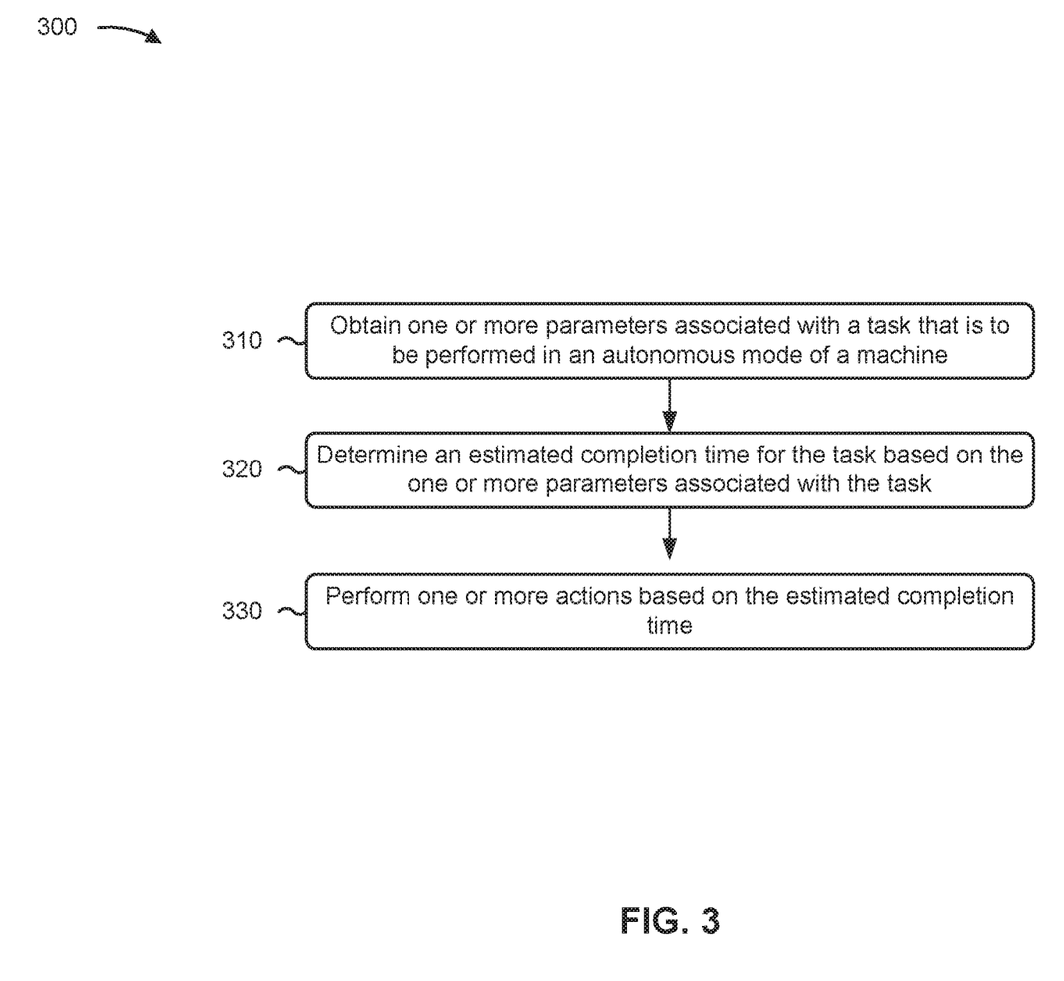
FIG. 3 is a flowchart of an example process for task completion time estimation for an autonomous machine.

FIG. 3 is a flowchart of an example process 300 for task completion time estimation for an autonomous machine. One or more process blocks of FIG. 3 may be performed by a controller (e.g., controller 114). Additionally, or alternatively, one or more process blocks of FIG. 3 may be performed by another device or a group of devices separate from or including the controller, such as another device or component that is internal or external to the machine 100.

As shown in FIG. 3, process 300 may include obtaining one or more parameters associated with a task (e.g., a compaction task) that is to be performed in an autonomous mode of a machine (block 310). For example, the controller (e.g., using a processor, a memory, a storage component, an input component, a communication interface, and/or the like) may obtain the one or more parameters, as described above. The task may be one of a plurality of tasks that are to be performed in the autonomous mode of the machine.

The one or more parameters (which may be configured by an operator of the machine) may relate to one or more of a speed at which the machine is to perform the task; an area in which the machine is to perform the task; a drum width of the machine; a blade width of the machine; an amount of overlap that is configured for lanes of the area; a quantity of passes that is configured for the area; a maneuver distance used by the machine when changing lanes of the area; or a maneuver speed used by the machine when changing lanes of the area.

As further shown in FIG. 3, process 300 may include determining an estimated completion time for the task based on the one or more parameters associated with the task (block 320). For example, the controller (e.g., using a processor, a memory, and/or the like) may determine the estimated completion time, as described above. Process 300 may include causing storage of information identifying an association between the task and the estimated completion time.

As further shown in FIG. 3, process 300 may include performing one or more actions based on the estimated completion time for the task (block 330). For example, the controller (e.g., using a processor, a memory, a storage component, an input component, an output component, a communication interface, and/or the like) may perform one or more actions based on the estimated completion time, as described above.

The one or more actions may include causing a display of the machine to display at least one of the estimated completion time, an updated estimated completion time, or a progress of the task; generating a schedule for the machine based on at least one of the estimated completion time, the updated estimated completion time, or the progress of the task; updating a schedule for the machine based on at least one of the estimated completion time, the updated estimated completion time, or the progress of the task; generating an alert based on at least one of the estimated completion time, the updated estimated completion time, or the progress of the task; or causing transmission of a notification based on at least one of the estimated completion time, the updated estimated completion time, or the progress of the task.

For example, the alert may be generated based on a determination that an amount of fuel in the machine is insufficient to power the machine until the estimated completion time. As another example, the notification may be transmitted based on a determination that the estimated completion time satisfies a threshold value. In some implementations, process 300 may include transmitting information identifying the estimated completion time to a device that is to perform scheduling of a worksite in which the machine is to operate.

Process 300 may include selectively causing an initiation of the task in the autonomous mode of the machine according to the association between the task and the estimated completion time. The initiation of the task may be caused based on whether a selection (e.g., by a human operator) is of the task or another task of a plurality of tasks. For example, the selection may be of the task, and the task is initiated with the estimated completion time.

Process 300 also may include determining, while the machine is performing the task in the autonomous mode, an updated estimated completion time based on an elapsed time since initiation of the task, and a progress of the task based on a movement of the machine. For example, process 300 may include obtaining, while the machine is autonomously performing the task, location data relating to a location of the machine, and determining the movement of the machine based on the location data. In addition, process 300 may include causing storage of information identifying an association between the updated estimated completion time and the progress of the task. Process 300 may include causing, after performance of the task has been discontinued, the machine to continue performance of the task in the autonomous mode using the association between the updated estimated completion time and the progress of the task.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed completion time estimation system 200 may be used with any machine 100 that can operate in an autonomous mode. For example, the completion time estimation system 200 may be used with any machine 100 where a completion time estimate of a task, performed in an autonomous mode of the machine 100, is desired. In this way, a human operator, a supervisor, a controller of the machine 100, or another device, may perform scheduling for the machine 100, scheduling for a worksite, and/or the like, based on the estimated completion time. This may improve a utilization of machinery resources, improve worksite scheduling, improve construction times, and/or the like. Moreover, the disclosed completion time estimation system 200 permits switching between tasks while maintaining current estimated completion times for the tasks, thereby further improving scheduling for the machine 100 and/or a worksite as tasks progress.

What is claimed is:
1. A machine, comprising:
   at least one of a propulsion system or a steering system configured to operate under automatic control in an autonomous mode of the machine; and
   a controller configured to:
      obtain one or more parameters associated with a task that is to be performed in the autonomous mode, the task being a compaction task or a grading task;
      determine an estimated completion time for the task based on the one or more parameters associated with the task; and
      perform one or more actions based on the estimated completion time for the task.
2. The machine of claim 1, wherein the controller, when performing the one or more actions, is configured to at least one of:
   cause a display of the machine to display the estimated completion time,
   generate a schedule for the machine based on the estimated completion time,
   update a schedule for the machine based on the estimated completion time,
   generate an alert based on the estimated completion time, or
   cause transmission of a notification based on the estimated completion time.

3. The machine of claim 2, wherein the alert is to be generated based on a determination that an amount of fuel in the machine is insufficient to power the machine until the estimated completion time.

4. The machine of claim 1, wherein the one or more parameters relate to one or more of:
   a speed at which the machine is to perform the task,
   an area in which the machine is to perform the task,
   a drum width of the machine,
   a blade width of the machine,
   an amount of overlap that is configured for lanes of the area,
   a quantity of passes that is configured for the area,
   a maneuver distance used by the machine when changing lanes of the area, or
   a maneuver speed used by the machine when changing lanes of the area.

5. The machine of claim 1, wherein at least one of the one or more parameters is configured by an operator of the machine.

6. The machine of claim 1, wherein the controller is further configured to:
   determine, while the machine is performing the task in the autonomous mode, an updated estimated completion time based on an elapsed time since initiation of the task, and a progress of the task based on a movement of the machine; and
   cause storage of information identifying an association between the updated estimated completion time and the progress of the compaction task or the grading task.

7. The machine of claim 6, wherein the controller is further configured to:
   cause, after performance of the task has been discontinued, the machine to continue performance of the task in the autonomous mode using the association between the updated estimated completion time and the progress of the task.

8. The machine of claim 7, wherein the progress of the task is to be used to determine a location at which the machine is to continue performance of the task, and the updated estimated completion time is to be used for the location.

9. A completion time estimation system, comprising:
   a controller configured to:
      obtain one or more parameters associated with a task that is to be performed in an autonomous mode of a machine,
         the task being one of a plurality of tasks that are to be performed in the autonomous mode of the machine, and
         the task being a compaction task or a grading task;
      determine an estimated completion time for the task based on the one or more parameters associated with the task;
      cause storage of information identifying an association between the task and the estimated completion time; and
      selectively cause an initiation of the task in the autonomous mode of the machine, according to the association between the task and the estimated completion time, based on whether a selection is of the task or another task of the plurality of tasks.

10. The completion time estimation system of claim 9, wherein the controller is further configured to at least one of:
    cause a display of the machine to display the estimated completion time upon the initiation,
    generate a schedule for the machine based on the estimated completion time,
    update a schedule for the machine based on the estimated completion time,
    generate an alert based on the estimated completion time, or
    cause transmission of a notification based on the estimated completion time.

11. The completion time estimation system of claim 10, wherein the notification is to be transmitted based on a determination that the estimated completion time satisfies a threshold value.

12. The completion time estimation system of claim 9, wherein the one or more parameters relate to one or more of:
    a speed at which the machine is to perform the task,
    an area in which the machine is to perform the task,
    a drum width of the machine,
    a blade width of the machine,
    an amount of overlap that is configured for lanes of the area,
    a quantity of passes that is configured for the area,
    a maneuver distance used by the machine when changing lanes of the area, or
    a maneuver speed used by the machine when changing lanes of the area.

13. The completion time estimation system of claim 9, wherein the controller is further configured to:
    cause transmission of information identifying the estimated completion time to a device that is to perform scheduling of a worksite in which the machine is to operate.

14. The completion time estimation system of claim 9, wherein the selection is of the task, and the task is initiated with the estimated completion time.

15. A method, comprising:
    obtaining one or more parameters associated with a task that is to be performed in an autonomous mode of a machine;
    determining an estimated completion time for the task based on the one or more parameters associated with the task,
       the task being a compaction task or a grading task;
    determining, while the machine is performing the task in the autonomous mode, an updated estimated completion time based on an elapsed time since initiation of the task, and a progress of the task based on a movement of the machine;
    causing storage of information identifying an association between the updated estimated completion time and the progress of the task; and
    performing one or more actions based on the association between the updated estimated completion time and the progress of the task.

16. The method of claim 15, wherein the one or more actions include:
    causing a display of the machine to display at least one of the estimated completion time, the updated estimated completion time, or the progress of the task,
    generating a schedule for the machine based on at least one of the estimated completion time, the updated estimated completion time, or the progress of the task,
    updating a schedule for the machine based on at least one of the estimated completion time, the updated estimated completion time, or the progress of the task,
    generating an alert based on at least one of the estimated completion time, the updated estimated completion time, or the progress of the task, or causing transmission of a notification based on at least one of the estimated completion time, the updated estimated completion time, or the progress of the task.

17. The method of claim 15, wherein the one or more parameters relate to one or more of:
   a speed at which the machine is to perform the task,
   an area in which the machine is to perform the task,
   a drum width of the machine,
   a blade width of the machine,
   an amount of overlap that is configured for lanes of the area,
   a quantity of passes that is configured for the area,
   a maneuver distance used by the machine when changing lanes of the area, or
   a maneuver speed used by the machine when changing lanes of the area.

18. The method of claim 15, further comprising:
   obtaining, while the machine is autonomously performing the task, location data relating to a location of the machine; and
   determining the movement of the machine based on the location data.

19. The method of claim 15, further comprising:
   transmitting information identifying the estimated completion time to a device that is to perform scheduling of a worksite in which the machine is to operate.

20. The method of claim 15, further comprising:
   causing, after performance of the task has been discontinued, the machine to continue performance of the task in the autonomous mode using the association between the updated estimated completion time and the progress of the task.

* * * * *